United States Patent [19]
Peterson

[11] Patent Number: 5,154,531
[45] Date of Patent: Oct. 13, 1992

[54] FLEXIBLE CORNER CONNECTOR FOR INSULATED GLASS PANEL SPACER FRAME

[75] Inventor: Larry W. Peterson, Everett, Wash.

[73] Assignee: Alumet Mfg., Inc., Marysville, Wash.

[21] Appl. No.: 682,512

[22] Filed: Apr. 9, 1991

[51] Int. Cl.⁵ .............................................. F16B 1/00
[52] U.S. Cl. .................................. 403/205; 403/295; 403/382; 403/403
[58] Field of Search ............... 403/402, 401, 403, 382, 403/295, 205

[56] References Cited

U.S. PATENT DOCUMENTS

| | | |
|---|---|---|
| 2,989,788 | 6/1961 | Kessler . |
| 3,269,455 | 8/1966 | Gillotti . |
| 3,866,380 | 2/1975 | Benson . |
| 4,011,706 | 3/1977 | Dupree . |
| 4,105,348 | 8/1978 | Anderson et al. . |
| 4,357,744 | 11/1982 | McKenzie et al. . |
| 4,453,855 | 6/1984 | Richter et al. . |
| 4,530,195 | 7/1985 | Leopold . |
| 4,683,634 | 8/1987 | Cole . |
| 4,822,205 | 4/1989 | Berdan . |
| 5,048,997 | 9/1991 | Peterson ............................. 403/295 |

FOREIGN PATENT DOCUMENTS

| | | | |
|---|---|---|---|
| 2438348 | 6/1976 | Fed. Rep. of Germany | ...... 403/401 |
| 2015687A | 7/1979 | United Kingdom . | |
| 2077833A | 12/1981 | United Kingdom . | |

*Primary Examiner*—Andrew V. Kundrat
*Attorney, Agent, or Firm*—Christensen, O'Connor, Johnson & Kindness

[57] ABSTRACT

A corner connector (10) for connecting adjacent first and second spacer sections (20, 22), to form an insulated panel spacer frame includes a first arm (12) joined by a flexible joint (15) to a second arm (14). The second arm includes a recess (44) adjacent the joint, and a deformable projection (46) projecting from an edge of the open face of the recess inwardly toward the bottom of the recess. The first arm includes a securement projection (38) protruding from adjacent the joint (15) that is receivable within the recess of the second arm alongside the deformable projection. The deformable projection is deformed by the securement projection and exerts a compressive force on the securement projection to releasably secure the first and second arms in a desired angular orientation.

9 Claims, 2 Drawing Sheets

FLEXIBLE CORNER CONNECTOR FOR INSULATED GLASS PANEL SPACER FRAME

TECHNICAL FIELD OF THE INVENTION

The present invention relates to the construction of spacer frames for insulated glass panels and, more particularly, to a flexible corner connector for connecting adjacent spacer sections to form a spacer frame.

BACKGROUND OF THE INVENTION

Window panes or glass panels having two or more panes of glass separated by insulating air spaces are well known in the art. Typically adjacent glass panes are separated by a peripheral frame constructed from tubular spacer sections joined together at adjacent ends. To form a corner of the frame, adjacent spacer sections are connected by a connector to seal the spacer sections from condensable ambient moisture, and to position the spacer sections in the desired relative angular configuration. Typically, the connectors have first and second arms that are insertable into adjacent tubular spacer sections. The first and second arms of conventional rigid connectors, for use in rectangular windows, are configured to form a right angle.

Flexible connectors have also been developed that include first and second arm portions joined by a flexible hinge portion. This type of conventional connector enables adjacent frame sections to be connected linearly. The connected sections are then pivoted relative to each other into the desired angular configuration, flexing the connector at the hinge. In order to secure the sections in this configuration, conventional flexible connectors typically include mating portions on each arm of the connector that are engaged when the connector is flexed to the desired angular configuration.

One such conventional flexible connector is provided by U.S. Pat. No. 4,822,205 to Berdan. The connector includes opposing interlocking fins formed on each arm portion. The flexed connector is maintained in position by frictional engagement of the fins. This type of flexible connector has proved to be unsatisfactory for use with large frames because the stresses imparted on the connector by the frame sections overcome the frictional resistance to separation of the connector from the flexed configuration.

Other flexible connectors have been developed that overcome the problem of inadvertent connector separation by including opposing locking portions on the first and second arms of the connectors. The locking portions are snapped together when the connector is flexed. While this type of conventional connector does remain securely in a flexed configuration, the connector cannot be separated to the straightened configuration without the use of excessive force or destruction of the engaging locking portions. Straightening of a flexed connector may be required during manufacture, or to repair leaking spacer frames in windows in which condensed moisture has formed.

SUMMARY OF THE INVENTION

The present invention is directed to a releasably securable flexible corner connector for connecting adjacent first and second spacer sections in a spacer frame for an insulated glass panel. The corner connector includes first and second arms that are connectable to the first and second spacer sections, respectively, and a flexible joint joining the first and second arms. The connector is further constructed and contoured such that the first arm can be selectively secured relative to the second arm in a desired angular orientation. To this end, the first arm includes a securement projection protruding adjacent the flexible joint, and the second arm includes a deformable portion adjacent the flexible joint. The securement projection of the first arm is engageable with the deformable portion of the second arm to deform the deformable portion. The deformed deformable portion exerts a compressive force on the securement projection to secure the first and second arms.

In a further aspect of the present invention, the second arm includes a recess formed adjacent the flexible joint. The deformable portion of the second arm comprises a deformable projection projecting from adjacent an edge of the open face of the recess, inwardly toward the bottom of the recess. When the connector is flexed, the securement projection of the first arm is insertable into the recess of the second arm, alongside the deformable projection to deform the deformable projection and secure the connector. In addition to the compressive force exerted by the deformed deformable projection, friction between the deformable projection and the securement projection serves to securely hold the corner connector in a flexed configuration.

In a still further aspect of the present invention, the securement projection of the first arm and the deformable projection of the second arm define opposing obtusely angled corners that engage when the connector is flexed. The deformable projection exerts a compressive force on both the first and second surfaces of the corresponding corner of the securement projection to further secure the connector in the flexed position.

Connectors constructed in accordance with the present invention are easily secured without the exertion of undue force. If necessary, during manufacture or for the purposes of repair, the connector can be unflexed by exerting a firm force on the connector, without causing damage to the connector, so that the connector can be reinserted when desired.

BRIEF DESCRIPTION OF THE DRAWINGS

The foregoing features and advantages of the present invention will be readily understood by one of ordinary skill in the art, upon reading the following specification taken in conjunction with the appended drawings, wherein.

DETAILED DESCRIPTION OF THE PREFERRED EMBODIMENT

Figure 1:
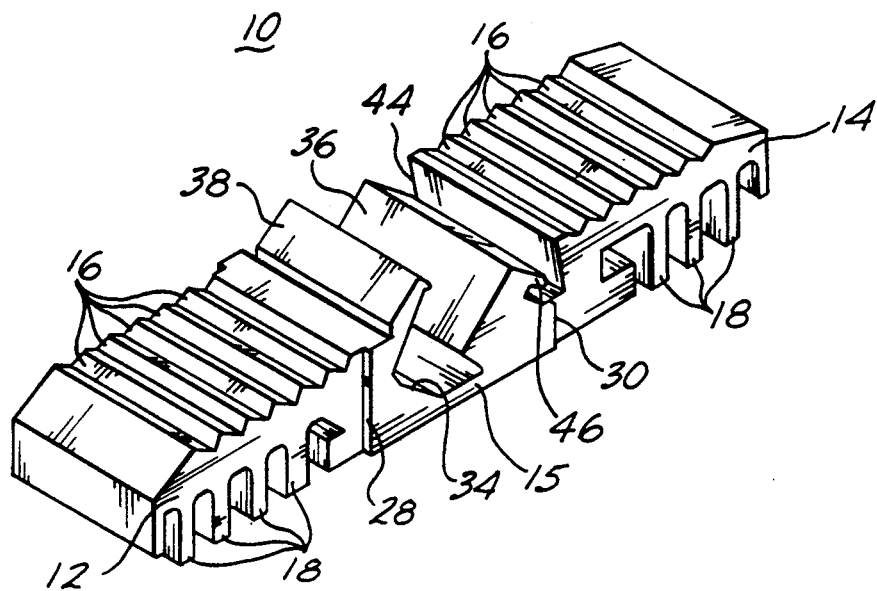
FIG. 1 is a pictorial view of a flexible corner connector constructed in accordance with the present invention.

The preferred embodiment of a corner connector 10 constructed in accordance with the present invention is shown in FIG. 1 in its unflexed, unsecured configuration. The corner connector includes a first elongate arm 12 and a second elongate arm 14 joined endwise by a flexible joint 15. The first and second arms 12 and 14 are similarly constructed with the exception of securement features to be discussed below. The arms 12 and 14 each have substantially rectangular cross sections. A first surface of each of the arms is formed with a series of transverse serrations 16. A series of tabs 18 protrudes generally orthogonally opposite the serrations 16 from a second surface of each of the first and second arms.

Figure 2:
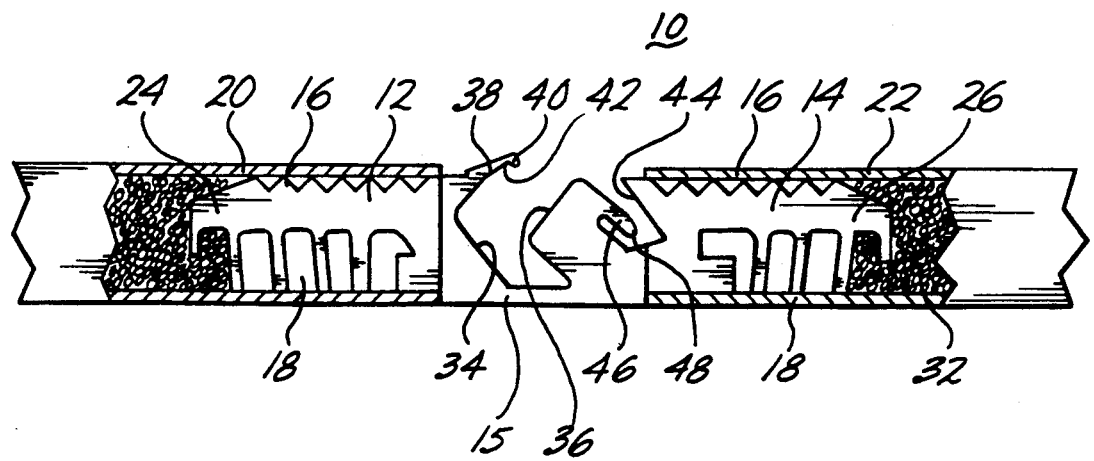
FIG. 2 is a side elevation view of the unsecured corner connector shown in FIG. 1 connected to spacer frame sections.

The function of the serrations 16 and tabs 18 is best understood in conjunction with FIG. 2, which shows the corner connector 10 engaging first and second spacer bar sections 20 and 22, respectively. The spacer sections 20 and 22 are of tubular construction, and typically are constructed from aluminum or steel. Each arm 12 and 14 includes a tapered leading end 24 and 26, respectively, to enable easy insertion of the arms into the respective spacer sections. Upon insertion of the arms into the spacer sections, the tabs 18 are flexed toward the flexible hinge 15 due to interference between the tabs and the sidewalls of the spacer sections 20 and 22. The flexed tabs exert a spring force against the sidewalls of the spacer sections to firmly connect the connector 10 to the spacer frame sections 20 and 22. The serrated edges 16 further aid in securing the corner connector to the spacer frame sections 20 and 22. Shoulders 28 and 30, respectively, are formed around each of the arms 12 and 14, in proximity to the flexible joint 15, to provide a stop for the ends of the tubular spacer sections 20 and 22. The arms 12 and 14 are dimensioned to block the ends of the frame sections 20 and 22, which may be filled with a desiccant 32, such as silica gel, as shown in FIG. 2.

The flexible joint 15 may be flexed to pivot the first and second arms 12 and 14 relative to each other to a desired angular configuration. The illustrated embodiment of the connector 10 is configured to allow flexing of the corner connector 10 to a right angle, as required for conventional rectangular windows. The first and second arms 12 and 14 include opposing complementary angled surfaces 34 and 36, respectively, formed adjacent the hinge 15, which contact each other when the corner connector is flexed to prevent further flexing past the right-angled configuration. However, it should be readily apparent that a corner connector could be constructed in accordance with the present invention to allow flexing of the connector to a different desired angular configuration, such as required for octagonal windows.

The corner connector 10 includes a mechanism to releasably secure the corner connector in the flexed configuration, as best understood with reference to FIGS. 1 and 2. The first arm 12 includes a securement flange 38 projecting from the stop surface 34 adjacent the serrated surface of the first arm 12. The flange 38 is angularly disposed to project outwardly away from the flexible joint 15, and toward the second arm 14. The flange 38 includes a ridge 40, having a generally semicircular cross section, formed along an edge of the flange's undersurface, adjacent the flange's distal end. The ridge 40 and undersurface of the flange 38 define an obtusely angled inner corner 42 that is transversely oriented with respect to the longitudinal axis of the first arm 12.

The second arm 14 includes a recessed slot 44 formed transversely between the stop surface 36 and the serrations 16. The second arm 14 further includes a transverse deformable flange 46 that projects inwardly from the stop surface 36, from one edge of the open face of the slot 44, toward the bottom of the slot 44. The flange 46 thus generally bifurcates the space within the slot 44. When viewed from the side, as in FIG. 2, the slot 44 thus defines a generally hook-shaped path. The distal end of the flange 46 defines a transverse obtuse outer corner 48 substantially corresponding to the inner corner 42 of the securement flange 38 of the first arm 12.

Figure 3:
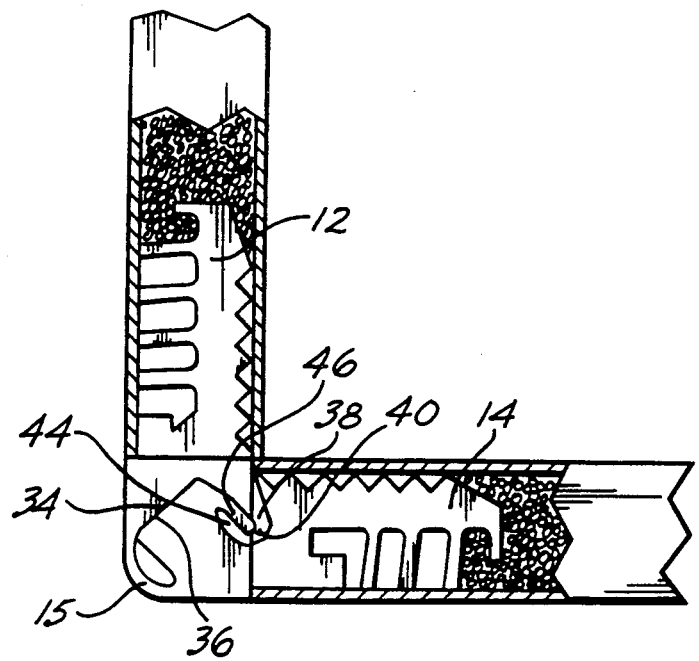
FIG. 3 is a side elevation view of the corner connector of FIG. 2 in the secured (flexed) configuration.

Reference is now had to FIG. 3 to describe the flexing of the corner connector to selectively engage the securement flange 38 with the deformable flange 46. As the first arm 12 is flexed toward the second arm 14, the securement flange 38 is inserted within the slot 44 alongside the deformable flange 46. As the flange 38 enters the slot 44, the distal end of the securement flange 38, including the ridge 40, causes the deformable flange 46 to be deflected toward the sidewall of the slot 44 closest in proximity to the hinge 15. When the connector is fully flexed to the secured position, the ridge 40 on the distal end of the securement flange 38 is inserted to just past the distal end of the deformable flange 46. The outside corner 48 on the flange 46 engages with the inside corner 42 on the flange 38.

Figure 4:
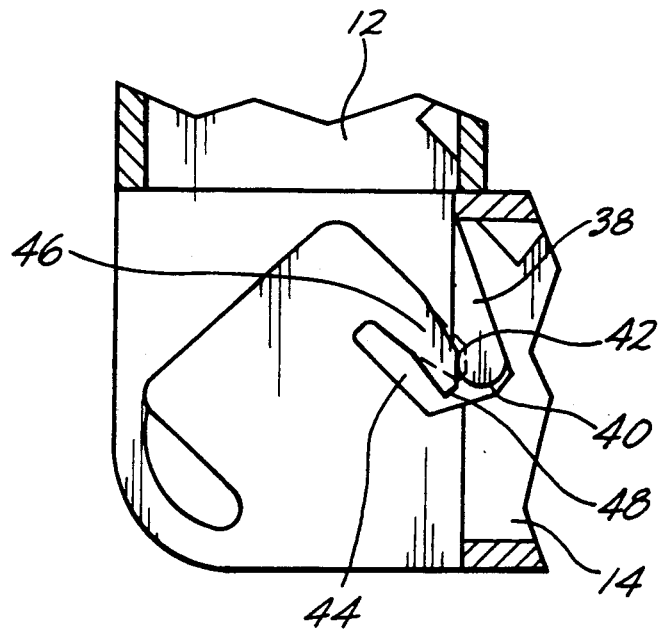
FIG. 4 is a partial side elevation of the secured corner connector of FIG. 3, showing detail of the deformed deformable projection.

Referring to the detailed view of FIG. 4, in this flexed, secured position, the deformable flange 46 is deflected from its relaxed position (shown in dashed lines). The deformable flange 46 is constructed of a stiff, resilient material, such as a polyamide plastic, commonly referred to as Nylon TM. Due to the resilient deformation of the flange 46, the securement flange 38 is compressed between the flange 46 and the sidewall of the slot 44. Further, because of the engagement of the outer corner 48 of the flange 46 and inner corner 42 of flange 38, respectively, the flange 46 exerts a compressive force against both adjoining surfaces of the corner 42 of the flange 38. Thus, a first component of the compressive force is exerted against the undersurface of the flange 38. A second component of the compressive force acts against the ridge 40, urging the flange 38 inwardly toward the bottom of the slot 44. This compressive force, together with the friction generated between contacting surfaces of the flange 46, flange 38, and sidewall of the slot 44, firmly secures the flange 38 in place to maintain the connector in the second configuration.

If it should become necessary at some point to unflex (straighten) the connector 10, it is possible to exert a firm force on the arms 12 and 14 to disengage the flange 38 from the slot 44. The obtuse angling of the corners 48 and 42 of the flanges 46 and 38, respectively, allows disengagement of the connector without requiring excessive force or destruction of any portion of the connector. Tests have shown that the force necessary to disengage the flange 38 from the slot 44 is substantially the same as the force initially required to insert the flange into the slot. Thus, the corner connector may be reused after it is disengaged.

Although the first and second arms 12 and 14 and flexible hinge 15 may be assembled from separate components, it is most economical to form the connector from a single integral piece of material, such as a plastic. Polyamide plastics are well suited for this application, having the necessary stiffness and resiliency properties.

One of ordinary skill in the art will be able to effect various changes, alterations and substitutions to the description of the preferred embodiment above, without departing from the broad concepts of the disclosed invention. It is therefore intended that the scope of Letters Patent granted hereon be limited only by the definition contained in the appended claims and the equivalents thereof.

The embodiments of the invention in which an exclusive property or privilege is claimed are defined as follows:

1. A corner connector for connecting adjacent first and second spacer sections in a spacer frame for an insulated glass panel, comprising:
    a first arm connectable to the first spacer section;
    a second arm connectable to the second spacer section;
    flexible joint means for joining said first arm and said second arm; and
    means for releasably securing said first arm relative to said second arm in a desired angular orientation, said means for releasably securing including:
        a securement projection protruding from said first arm adjacent said joint means; and
        a deformable portion of said second arm adjacent said joint means, said securement projection and said deformable portion constructed and contoured to enable engagement of said securement projection with said deformable portion to deform said deformable portion so that said deformable portion remains deformed after engagement and exerts a compressive force on said securement projection to releasably secure said first and second arms.

2. A corner connector for connecting adjacent first and second spacer sections in a spacer frame for an insulated glass panel, comprising:
    a first arm connectable to the first spacer section;
    flexible joint means;
    a second arm joined to said first arm by said joint means and connectable to the second spacer section, wherein said second arm includes a recess formed adjacent said joint means defining an open face and a bottom; and
    means for releasably securing said first arm relative to said second arm in a desired angular orientation, said means for releasably securing including:
        a securement projection protruding from said first arm adjacent said joint means; and
        a deformable portion of said second arm adjacent said joint means, said securement projection and said deformable portion constructed and contoured to enable engagement of said securement projection with said deformable portion to deform said deformable portion so that said deformable portion exerts a compressive force on said securement projection to releasably secure said first and second arms, wherein
    said deformable portion of said second arm comprises a deformable projection projecting from an edge of the open face of said recess inwardly toward the bottom of said recess, said securement projection of said first arm being receivable within said recess to deform said deformable projection.

3. The corner connector of claim 2, wherein:
    said securement projection defines first and second surfaces forming a corner proximate a distal end of said securement projections; and
    said deformable projection defines a corresponding corner proximate a distal end of said deformable projections, said corner of said deformable projection engaging with said corner of said securement projection to exert a compressive force on both said first and second surfaces of said corner of said securement projection.

4. The corner connector of claim 3, wherein the corner defined by said securement projection and the corner defined by said deformable projection are opposing, obtusely angled corners.

5. The corner connector of claim 3, wherein:
    said securement projection and said deformable projection are further constructed and contoured to generate frictional resistance to disengagement of said engaged securement projection and deformable projection.

6. The corner connector of claim 1, wherein said first arm, said second arm, said flexible joint means, and said means for selectively securing said first and second arms comprise an integral piece formed from a plastic material.

7. The corner connector of claim 6, wherein said plastic material is a polyamide.

8. The corner connector of claim 1, wherein said securement projection of said first arm is further constructed and contoured to be selectively disengageable from said deformable portion of said second arm without destructing said means for selectively securing said first and second arms.

9. A corner connector for connecting adjacent first and second sections in a spacer frame for an insulated glass panel, comprising:
    a first arm connectable to the first spacer section;
    flexible joint means;
    a second arm joined to said first arm by said joint means and connectable to the second spacer section, wherein said second arm defines a recess formed adjacent said joint means; and
    means for releasably securing said first arm relative to said second arm in a desired angular orientation, said means for releasably securing including:
        a securement projection protruding from said first arm adjacent said joint means; and
        a deformable projection defined by said second arm and disposed to project inwardly into said recess in said second arm, said securement projection of said first arm being receivable within said recess in said second arm to engage with and deform said deformable projection of said second arm so that said deformable projection exerts a compressive force on said securement projection to releasably secure said first and second arms.

* * * * *